United States Patent
Cho et al.

(10) Patent No.: US 9,829,075 B2
(45) Date of Patent: Nov. 28, 2017

(54) PLANETARY GEAR TRAIN OF AUTOMATIC TRANSMISSION FOR VEHICLE

(71) Applicant: Hyundai Motor Company, Seoul (KR)

(72) Inventors: Wonmin Cho, Hwaseong-si (KR); Jae Chang Kook, Hwaseong-si (KR); Myeong Hoon Noh, Seongnam-si (KR); Seongwook Ji, Ansan-si (KR); Kangsoo Seo, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 81 days.

(21) Appl. No.: 14/933,660

(22) Filed: Nov. 5, 2015

(65) Prior Publication Data
US 2016/0356353 A1 Dec. 8, 2016

(30) Foreign Application Priority Data

Jun. 2, 2015 (KR) .................. 10-2015-0077994

(51) Int. Cl.
*F16H 3/66* (2006.01)

(52) U.S. Cl.
CPC ........ *F16H 3/66* (2013.01); *F16H 2200/0073* (2013.01); *F16H 2200/2012* (2013.01); *F16H 2200/2046* (2013.01)

(58) Field of Classification Search
CPC combination set(s) only.
See application file for complete search history.

(56) References Cited

U.S. PATENT DOCUMENTS

| 2013/0260947 | A1* | 10/2013 | Mellet ............... F16H 3/62 475/276 |
| 2013/0267372 | A1 | 10/2013 | Mellet et al. |
| 2014/0057753 | A1* | 2/2014 | Hart ............... F16H 3/66 475/278 |
| 2015/0031492 | A1 | 1/2015 | Lippert et al. |

FOREIGN PATENT DOCUMENTS

| KR | 10-1427977 B1 | 8/2014 |
| KR | 10-1459477 B1 | 11/2014 |

* cited by examiner

*Primary Examiner* — Justin Holmes
*Assistant Examiner* — Timothy M Hannon
(74) *Attorney, Agent, or Firm* — Morgan, Lewis & Bockius LLP

(57) ABSTRACT

A planetary gear train of automatic transmission may include input shaft, output gear, first to fourth planetary gear sets, first rotating shaft including first sun gear, second rotating shaft including first planet carrier, second ring gear, third planet carrier, and fourth ring gear, third rotating shaft including first ring gear and third ring gear, and selectively connected to transmission housing, fourth rotating shaft including second sun gear, and selectively connected to transmission housing, fifth rotating shaft including second planet carrier, and selectively connected with first rotating shaft and simultaneously and directly connected with input shaft, sixth rotating shaft including third sun gear, seventh rotating shaft including fourth sun gear, and selectively connected with sixth rotating shaft and simultaneously and selectively connected to transmission housing, eighth rotating shaft including fourth planet carrier, and selectively connected with sixth rotating shaft and simultaneously and directly connected with output gear, and six friction elements.

9 Claims, 2 Drawing Sheets

FIG. 2

|  | C1 | C2 | C3 | B1 | B2 | B3 |
|---|---|---|---|---|---|---|
| 1ST | O |  |  | O |  | O |
| 2ND | O |  | O | O |  |  |
| 3RD | O | O |  | O |  |  |
| 4TH | O | O | O |  |  |  |
| 5TH | O | O |  |  |  | O |
| 6TH | O | O |  |  | O |  |
| 7TH | O |  |  |  | O | O |
| 8TH | O |  | O |  | O |  |
| 9TH |  | O | O |  | O |  |
| 10TH |  |  | O | O | O |  |
| 11TH |  | O |  | O | O |  |
| REV | O |  | O |  |  | O | ns
PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2015-0077994 filed in the Korean Intellectual Property Office on Jun. 2, 2015, the entire contents of which are incorporated herein by reference.

BACKGROUND OF THE INVENTION

Field of the Invention

The present invention relates to an automatic transmission for a vehicle, and more particularly, to a planetary gear train of an automatic transmission for a vehicle which is capable of improving power transmission performance and reducing fuel consumption by implementing eleven forward speeds using a minimum number of configurations.

Description of the Related Art

The recent increase in oil prices has caused carmakers to meet global demands of improving fuel efficiency.

Accordingly, researches are being conducted on engines in terms of reducing weight and improving fuel efficiency by down-sizing, and researches are also being conducted to ensure both drivability and competitiveness by maximizing fuel efficiency by implementing an automatic transmission with multiple stages.

However, in the case of the automatic transmission, the number of internal components is increased as the number of gear shift stages is increased, which may cause deterioration in terms of mountability, costs, weight, and power transmission efficiency.

Therefore, in order to increase an effect of improving fuel efficiency by implementing an automatic transmission with multiple stages, it is important to develop a planetary gear train capable of maximizing efficiency using a small number of components.

In this respect, recently, an eight-speed automatic transmission and a nine-speed automatic transmission have been implemented, and researches and developments are being actively conducted on a planetary gear train that may implement gear shift stages for eight or more speeds.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle, which is capable of obtaining an effect of improving power transmission performance and fuel efficiency by implementing an automatic transmission with multiple stages and implementing the gear shift stages for eleven forward speeds and one reverse speed using a minimum number of configurations, and also capable of improving noise reducing properties when the vehicle travels by ensuring an operating point of an engine within a low rotational speed region.

An exemplary embodiment of the present invention provides a planetary gear train of an automatic transmission for a vehicle, the planetary gear train including: an input shaft which receives power from an engine; an output gear which outputs power changed in speed; a first planetary gear set which has a first sun gear, a first planet carrier, and a first ring gear; a second planetary gear set which has a second sun gear, a second planet carrier, and a second ring gear; a third planetary gear set which has a third sun gear, a third planet carrier, and a third ring gear; a fourth planetary gear set which has a fourth sun gear, a fourth planet carrier, and a fourth ring gear; a first rotating shaft which includes the first sun gear; a second rotating shaft which includes the first planet carrier, the second ring gear, the third planet carrier, and the fourth ring gear; a third rotating shaft which includes the first ring gear and the third ring gear, and is selectively connected to a transmission housing; a fourth rotating shaft which includes the second sun gear, and is selectively connected to the transmission housing; a fifth rotating shaft which includes the second planet carrier, and is selectively connected with the first rotating shaft and simultaneously and directly connected with the input shaft; a sixth rotating shaft which includes the third sun gear; a seventh rotating shaft which includes the fourth sun gear, and is selectively connected with the sixth rotating shaft and simultaneously and selectively connected to the transmission housing; an eighth rotating shaft which includes the fourth planet carrier, and is selectively connected with the sixth rotating shaft and simultaneously and directly connected with the output gear; and six friction elements which are disposed between the rotating shafts, and disposed at portions where the rotating shafts are selectively connected to the transmission housing.

The first, second, third, and fourth planetary gear sets may be configured as single pinion planetary gear sets.

The first, second, third, and fourth planetary gear sets may be sequentially disposed from the engine side.

The six friction elements may include: a first clutch which is interposed between the first rotating shaft and the fifth rotating shaft; a second clutch which is interposed between the sixth rotating shaft and the eighth rotating shaft; a third clutch which is interposed between the sixth rotating shaft and the seventh rotating shaft; a first brake which is interposed between the third rotating shaft and the transmission housing; a second brake which is interposed between the fourth rotating shaft and the transmission housing; and a third brake which is interposed between the seventh rotating shaft and the transmission housing.

Gear shift stages, which are implemented by selectively operating the six friction elements, include: a first forward gear shift stage which is implemented by simultaneously operating the first clutch and the first and third brakes; a second forward gear shift stage which is implemented by simultaneously operating the first and third clutches and the first brake; a third forward gear shift stage which is implemented by simultaneously operating the first and second clutches and the first brake; a fourth forward gear shift stage which is implemented by simultaneously operating the first, second, and third clutches; a fifth forward gear shift stage which is implemented by simultaneously operating the first and second clutches and the third brake; a sixth forward gear shift stage which is implemented by simultaneously operating the first and second clutches and the second brake; a seventh forward gear shift stage which is implemented by simultaneously operating the first clutch and the second and third brakes; an eighth forward gear shift stage which is implemented by simultaneously operating the first and third clutches and the second brake; a ninth forward gear shift stage which is implemented by simultaneously operating the second and third clutches and the second brake; a tenth forward gear shift stage which is implemented by simultaneously operating the third clutch and the first and second brakes; an eleventh forward gear shift stage which is implemented by simultaneously operating the second clutch and the first and second brakes; and a reverse gear shift stage which is implemented by simultaneously operating the first and third clutches and the third brake.

According to the exemplary embodiment of the present invention, it is possible to implement the gear shift stages for eleven forward speeds by combining the four planetary gear sets, which are simple planetary gear sets, with six friction elements, thereby improving power transmission performance and fuel efficiency.

In addition, it is possible to implement the gear shift stages suitable for rotational speeds of the engine by implementing the automatic transmission with the multiple stages, and as a result, it is possible to greatly improve noise reducing properties when the vehicle travels.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table representing operations at respective gear shift stages implemented by respective friction elements applied to the planetary gear train according to the exemplary embodiment of the present invention.

Figure 1:
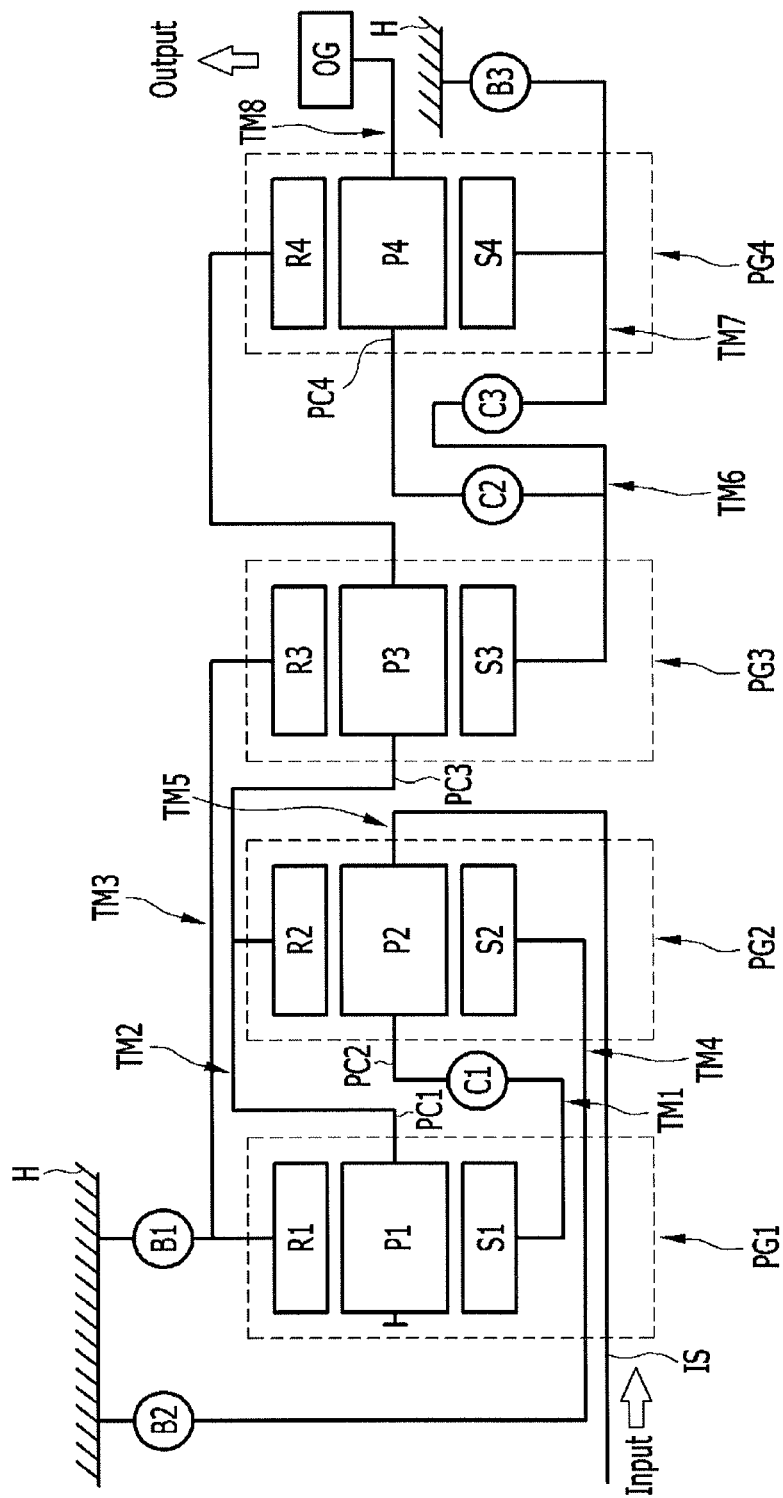
FIG. 1 is a configuration diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, parts irrelevant to the description will be omitted to clearly describe the exemplary embodiments of the present invention, and the same or similar constituent elements will be designated by the same reference numerals throughout the specification.

In the following description, names of constituent elements are classified as a first, a second, and the like so as to discriminate the constituent elements having the same name, and the names are not necessarily limited to the order.

FIG. 1 is a configuration diagram of a planetary gear train according to an exemplary embodiment of the present invention.

Referring to FIG. 1, the planetary gear train according to the exemplary embodiment of the present invention includes first, second, third, and fourth planetary gear sets PG1, PG2, PG3, and PG4 which are coaxially disposed, an input shaft IS, an output shaft OS, eight rotating shafts TM1 to TM8 which directly connect respective rotating elements of the first, second, third, and fourth planetary gear sets PG1, PG2, PG3, and PG4, six friction elements C1 to C4, B1, and B2, and a transmission housing H.

Therefore, rotational power inputted from the input shaft IS is changed in speed by complementary operations of the first, second, third, and fourth planetary gear sets PG1, PG2, PG3, and PG4, and then outputted through an output gear OG.

Further, the respective simple planetary gear sets are disposed in the order of the first, second, third, and fourth planetary gear sets PG1, PG2, PG3, and PG4 from an engine side.

The input shaft IS is an input member, and rotational power from a crankshaft of the engine is converted into torque by a torque converter and the torque is inputted.

The output gear OG is an output member, and transmits driving power, which is changed in speed, to a driving shaft through a differential apparatus.

The first planetary gear set PG1 is a single pinion planetary gear set, and includes rotating elements including a first sun gear S1, a first planet carrier PC1 which supports a first pinion P1 that externally engages with the first sun gear S1, and a first ring gear R1 which internally engages with the first pinion P1.

The second planetary gear set PG2 is a single pinion planetary gear set, and includes a second sun gear S2, a second planet carrier PC2 which supports a second pinion P2 that externally engages with the second sun gear S2, and a second ring gear R2 which internally engages with the second pinion P2.

The third planetary gear set PG3 is a single pinion planetary gear set, and includes a third sun gear S3, a third planet carrier PC3 which supports a third pinion P3 that externally engages with the third sun gear S3, and a third ring gear R3 which internally engages with the third pinion P3.

The fourth planetary gear set PG4 is a single pinion planetary gear set, and includes a fourth sun gear S4, a fourth planet carrier PC4 which supports a fourth pinion P4 that externally engages with the fourth sun gear S4, and a fourth ring gear R4 which internally engages with the fourth pinion P4.

Further, one or more rotating elements of the first, second, third, and fourth planetary gear sets PG1, PG2, PG3, and PG4 are directly connected to each other, and the first, second, third, and fourth planetary gear sets PG1, PG2, PG3, and PG4 are operated while retaining the total of eight rotating shafts TM1 to TM8.

The configurations of the eight rotating shafts TM1 to TM8 will be described below.

The first rotating shaft TM1 includes the first sun gear S1.

The second rotating shaft TM2 includes the first planet carrier PC1, the second ring gear R2, the third planet carrier PC3, and the fourth ring gear R4.

The third rotating shaft TM3 includes the first ring gear R1 and the third ring gear R3, and is selectively connected with the transmission housing H.

The fourth rotating shaft TM4 includes the second sun gear S2, and is selectively connected with the transmission housing H.

The fifth rotating shaft TM5 includes the second planet carrier PC2, and is selectively connected with the first rotating shaft TM1 and simultaneously and directly connected with the input shaft IS so as to always be operated as an input element.

The sixth rotating shaft TM6 includes the third sun gear S3.

The seventh rotating shaft TM7 includes the fourth sun gear S4, and is selectively connected with the sixth rotating shaft TM6 and simultaneously and selectively connected with the transmission housing H.

The eighth rotating shaft TM8 includes the fourth planet carrier PC4, and is selectively connected with the sixth rotating shaft TM6 and simultaneously and directly connected with the output gear OG so as to always be operated as an output element.

Further, three clutches C1, C2, and C3, which are friction elements, are disposed at portions where the respective rotating shafts of the rotating shafts TM1 to TM8 are selectively connected to each other.

In addition, three brakes B1, B2, and B3, which are friction elements, are disposed at portions where the rotating shafts of the rotating shafts TM1 to TM8 are selectively connected with the transmission housing H.

Positions at which the six friction elements C1 to C3 and B1 to B3 are disposed will be described below.

The first clutch C1 is interposed between the first rotating shaft TM1 and the fifth rotating shaft TM5, and allows the first rotating shaft TM1 and the fifth rotating shaft TM5 to be selectively integrated with each other.

The second clutch C2 is interposed between the sixth rotating shaft TM6 and the eighth rotating shaft TM8, and allows the sixth rotating shaft TM6 and the eighth rotating shaft TM8 to be selectively integrated with each other.

The third clutch C3 is interposed between the sixth rotating shaft TM6 and the seventh rotating shaft TM7, and allows the sixth rotating shaft TM6 and the seventh rotating shaft TM7 to be selectively integrated with each other.

The first brake B1 is interposed between the third rotating shaft TM3 and the transmission housing H, and allows the third rotating shaft TM3 to be operated as a selectively fixed element.

The second brake B2 is interposed between the fourth rotating shaft TM4 and the transmission housing H, and allows the fourth rotating shaft TM4 to be operated as a selectively fixed element.

The third brake B3 is interposed between the seventh rotating shaft TM7 and the transmission housing H, and allows the seventh rotating shaft TM7 to be operated as a selectively fixed element.

The friction elements, which include the first, second, and third clutches C1, C2, and C3 and the first, second, and third brakes B1, B2, and B3 as described above, may be multi-plate hydraulic frictional coupling units that are frictionally coupled by hydraulic pressure.

FIG. 2 is a table representing operations at respective gear shift stages implemented by respective friction elements applied to the planetary gear train according to the exemplary embodiment of the present invention.

As illustrated in FIG. 2, according to the planetary gear train according to the exemplary embodiment of the present invention, gear shift operations are carried out by operating the three friction elements at respective gear shift stages.

A gear shift stage for a first forward speed 1ST is implemented by simultaneously operating the first clutch C1 and the first and third brakes B1 and B3.

A gear shift stage for a second forward speed 2ND is implemented by simultaneously operating the first and third clutches C1 and C3 and the first brake B1.

A gear shift stage for a third forward speed 3RD is implemented by simultaneously operating the first and second clutches C1 and C2 and the first brake B1.

A gear shift stage for a fourth forward speed 4TH is implemented by simultaneously operating the first, second, and third clutches C1, C2, and C3.

A gear shift stage for a fifth forward speed 5TH is implemented by simultaneously operating the first and second clutches C1 and C2 and the third brake B3.

A gear shift stage for a sixth forward speed 6TH is implemented by simultaneously operating the first and second clutches C1 and C2 and the second brake B2.

A gear shift stage for a seventh forward speed 7TH is implemented by simultaneously operating the first clutch C1 and the second and third brakes B2 and B3.

A gear shift stage for an eighth forward speed 8TH is implemented by simultaneously operating the first and third clutches C1 and C3 and the second brake B2.

A gear shift stage for a ninth forward speed 9TH is implemented by simultaneously operating the second and third clutches C2 and C3 and the second brake B2.

A gear shift stage for a tenth forward speed 10TH is implemented by simultaneously operating the third clutch C3 and the first and second brakes B1 and B2.

A gear shift stage for an eleventh forward speed 11TH is implemented by simultaneously operating the second clutch C2 and the first and second brakes B1 and B2.

A reverse gear shift stage REV is implemented by simultaneously operating the first and third clutches C1 and C3 and the third brake B3.

The aforementioned gear shift operations will be described in more detail below.

At the gear shift stage for the first forward speed 1ST, when the first clutch C1 and the first and third brakes B1 and B3 are operated simultaneously, the first rotating shaft TM1 is connected with the fifth rotating shaft TM5 such that power is inputted to the fifth rotating shaft TM5, and a gear shift operation for the first forward speed is carried out while the third and seventh rotating shafts TM3 and TM7 are operated as fixed elements.

At the gear shift stage for the second forward speed 2ND, when the first and third clutches C1 and C3 and the first brake B1 are operated simultaneously, the first rotating shaft TM1 is connected with the fifth rotating shaft TM5, and the sixth rotating shaft TM6 is connected with the seventh rotating shaft TM7, such that power is inputted to the fifth rotating shaft TM5, and a gear shift operation for the second forward speed is carried out while the third rotating shaft TM3 is operated as a fixed element.

At the gear shift stage for the third forward speed 3RD, when the first and second clutches C1 and C2 and the first brake B1 are operated simultaneously, the first rotating shaft TM1 is connected with the fifth rotating shaft TM5, and the sixth rotating shaft TM6 is connected with the eighth rotating shaft TM8, such that power is inputted to the fifth rotating shaft TM5, and a gear shift operation for the third forward speed is carried out while the third rotating shaft TM3 is operated as a fixed element.

At the gear shift stage for the fourth forward speed 4TH, when the first, second, and third clutches C1, C2, and C3 are operated simultaneously, the first rotating shaft TM1 is connected with the fifth rotating shaft TM5, and the sixth rotating shaft TM6 is connected with the seventh and eighth rotating shafts TM7 and TM8, such that all of the above rotating shafts are directly connected, and as a result, while power is inputted to the fifth rotating shaft TM5, a gear shift operation for the fourth forward speed, which outputs the inputted power as it is, is carried out.

At the gear shift stage for the fifth forward speed 5TH, when the first and second clutches C1 and C2 and the third brake B3 are operated simultaneously, the first rotating shaft TM1 is connected with the fifth rotating shaft TM5, and the sixth rotating shaft TM6 is connected with the eighth rotating shaft TM8, such that power is inputted to the fifth rotating shaft TM5, and a gear shift operation for the fifth forward speed is carried out while the seventh rotating shaft TM7 is operated as a fixed element.

At the gear shift stage for the sixth forward speed 6TH, when the first and second clutches C1 and C2 and the second brake B2 are operated simultaneously, the first rotating shaft TM1 is connected with the fifth rotating shaft TM5, and the sixth rotating shaft TM6 is connected with the eighth rotating shaft TM8, such that power is inputted to the fifth rotating shaft TM5, and a gear shift operation for the sixth forward speed is carried out while the fourth rotating shaft TM4 is operated as a fixed element.

At the gear shift stage for the seventh forward speed 7TH, when the first clutch C1 and the second and third brakes B2 and B3 are operated simultaneously, the first rotating shaft TM1 is connected with the fifth rotating shaft TM5, such that power is inputted to the fifth rotating shaft TM5, and a gear shift operation for the seventh forward speed is carried out while the fourth and seventh rotating shafts TM4 and TM7 are operated as fixed elements.

At the gear shift stage for the eighth forward speed 8TH, when the first and third clutches C1 and C3 and the second brake B2 are operated simultaneously, the first rotating shaft TM1 is connected with the fifth rotating shaft TM5, and the sixth rotating shaft TM6 is connected with the seventh rotating shaft TM7, such that power is inputted to the fifth rotating shaft TM5, and a gear shift operation for the eighth forward speed is carried out while the fourth rotating shaft TM4 is operated as a fixed element.

At the gear shift stage for the ninth forward speed 9TH, when the second and third clutches C2 and C3 and the second brake B2 are operated simultaneously, the sixth rotating shaft TM6 is connected with the seventh and eighth rotating shafts TM7 and TM8, such that power is inputted to the fifth rotating shaft TM5, and a gear shift operation for the ninth forward speed is carried out while the fourth rotating shaft TM4 is operated as a fixed element.

At the gear shift stage for the tenth forward speed 10TH, when the third clutch C3 and the first and second brakes B1 and B2 are operated simultaneously, the sixth rotating shaft TM6 is connected with the seventh rotating shaft TM7, such that power is inputted to the fifth rotating shaft TM5, and a gear shift operation for the tenth forward speed is carried out while the third and fourth rotating shafts TM3 and TM4 are operated as fixed elements.

At the gear shift stage for the eleventh forward speed 11TH, when the second clutch C2 and the first and second brakes B1 and B2 are operated simultaneously, the sixth rotating shaft TM6 is connected with the eighth rotating shaft TM8, such that power is inputted to the fifth rotating shaft TM5, and a gear shift operation for the eleventh forward speed is carried out while the third and fourth rotating shafts TM3 and TM4 are operated as fixed elements.

At the reverse gear shift stage REV, when the first and third clutches C1 and C3 and the third brake B3 are operated simultaneously, the first rotating shaft TM1 is connected with the fifth rotating shaft TM5, and the sixth rotating shaft TM6 is connected with the seventh rotating shaft TM7, such that power is inputted to the fifth rotating shaft TM5, and a reverse gear shift operation is carried out while the seventh rotating shaft TM7 is operated as a fixed element.

As described above, the planetary gear train according to the exemplary embodiment of the present invention may implement the gear shift stages for eleven forward speeds and one reverse speed by operating and controlling the four planetary gear sets PG1, PG2, PG3, and PG4 using the three clutches C1, C2, and C3 and the three brakes B1, B2, and B3.

Therefore, the planetary gear train according to the exemplary embodiment of the present invention may improve power transmission efficiency and fuel efficiency by implementing the automatic transmission with the multiple stages.

In addition, it is possible to implement the gear shift stages suitable for rotational speeds of the engine by implementing the automatic transmission with the multiple stages, and as a result, it is possible to greatly improve noise reducing properties when the vehicle travels.

In addition, since the three friction elements are operated for each gear shift stage, the number of friction elements, which are not operated, is minimized to reduce a loss caused by frictional drag, thereby improving power transmission efficiency and fuel efficiency.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, the planetary gear train comprising:

an input shaft which receives power from an engine;
an output gear which outputs power changed in speed;
a first planetary gear set having a first sun gear, a first planet carrier, and a first ring gear;
a second planetary gear set having a second sun gear, a second planet carrier, and a second ring gear;
a third planetary gear set having a third sun gear, a third planet carrier, and a third ring gear;
a fourth planetary gear set having a fourth sun gear, a fourth planet carrier, and a fourth ring gear;
a first rotating shaft directly connected to the first sun gear;
a second rotating shaft directly connected to the first planet carrier, the second ring gear, the third planet carrier, and the fourth ring gear;
a third rotating shaft directly connected to the first ring gear and the third ring gear, and selectively connected to a transmission housing;
a fourth rotating shaft directly connected to the second sun gear, and selectively connected to the transmission housing;
a fifth rotating shaft directly connected to the second planet carrier, and selectively connected with the first rotating shaft and simultaneously and directly connected with the input shaft;
a sixth rotating shaft directly connected to the third sun gear;
a seventh rotating shaft directly connected to the fourth sun gear, and selectively connected with the sixth rotating shaft and simultaneously and selectively connected to the
an eighth rotating shaft directly connected to the fourth planet carrier, and selectively connected with the sixth rotating shaft and simultaneously and directly connected with the output gear; and
six friction elements which are disposed between the rotating shafts, and disposed at portions where the rotating shafts are selectively connected to the transmission housing.

2. The planetary gear train of claim 1, wherein the first, second, third, and fourth planetary gear sets are configured as single pinion planetary gear sets.

3. The planetary gear train of claim 1, wherein the first, second, third, and fourth planetary gear sets are sequentially disposed from an engine side.

4. The planetary gear train of claim 1, wherein the six friction elements include:
a first clutch which is interposed between the first rotating shaft and the fifth rotating shaft;
a second clutch which is interposed between the sixth rotating shaft and the eighth rotating shaft;
a third clutch which is interposed between the sixth rotating shaft and the seventh rotating shaft;
a first brake which is interposed between the third rotating shaft and the transmission housing;
a second brake which is interposed between the fourth rotating shaft and the transmission housing; and
a third brake which is interposed between the seventh rotating shaft and the transmission housing.

5. The planetary gear train of claim 4, wherein gear shift stages, which are implemented by selectively operating the six friction elements, include:
a first forward gear shift stage which is implemented by simultaneously operating the first clutch and the first and third brakes;
a second forward gear shift stage which is implemented by simultaneously operating the first and third clutches and the first brake;
a third forward gear shift stage which is implemented by simultaneously operating the first and second clutches and the first brake;
a fourth forward gear shift stage which is implemented by simultaneously operating the first, second, and third clutches;
a fifth forward gear shift stage which is implemented by simultaneously operating the first and second clutches and the third brake;
a sixth forward gear shift stage which is implemented by simultaneously operating the first and second clutches and the second brake;
a seventh forward gear shift stage which is implemented by simultaneously operating the first clutch and the second and third brakes;
an eighth forward gear shift stage which is implemented by simultaneously operating the first and third clutches and the second brake;
a ninth forward gear shift stage which is implemented by simultaneously operating the second and third clutches and the second brake;
a tenth forward gear shift stage which is implemented by simultaneously operating the third clutch and the first and second brakes;
an eleventh forward gear shift stage which is implemented by simultaneously operating the second clutch and the first and second brakes; and
a reverse gear shift stage which is implemented by simultaneously operating the first and third clutches and the third brake.

6. A planetary gear train of an automatic transmission for a vehicle, the planetary gear train comprising:
an input shaft which receives power from an engine;
an output gear which outputs power changed in speed;
a first planetary gear set having a first sun gear, a first planet carrier, and a first ring gear;
a second planetary gear set having a second sun gear, a second planet carrier, and a second ring gear;
a third planetary gear set having a third sun gear, a third planet carrier, and a third ring gear;
a fourth planetary gear set having a fourth sun gear, a fourth planet carrier, and a fourth ring gear,
wherein the input shaft is directly connected to the second planet carrier,
wherein the output gear is directly connected to the fourth planet carrier,
wherein the first planet carrier, the second ring gear, the third planet carrier, and the fourth ring gear are directly connected, and
wherein the first ring gear and the third ring gear are directly connected;
wherein a first clutch which selectively connects the first sun gear and the second planet carrier;
wherein a second clutch which selectively connects the third sun gear and the fourth planet carrier;
wherein a third clutch which selectively connects the third sun gear and the fourth sun gear;
wherein a first brake which selectively connects the first ring gear to a transmission housing;
wherein a second brake which selectively connects the second sun gear to the transmission housing; and
wherein a third brake which selectively connects the fourth sun gear to the transmission housing.

7. The planetary gear train of claim 6, wherein the first, second, third, and fourth planetary gear sets are configured as single pinion planetary gear sets.

8. The planetary gear train of claim 6, wherein the first, second, third, and fourth planetary gear sets are sequentially disposed from an engine side.

9. The planetary gear train of claim 6, wherein gear shift stages, which are implemented by selectively operating the first, second, and third clutches and the first, second, and third brakes, include:
- a first forward gear shift stage which is implemented by simultaneously operating the first clutch and the first and third brakes;
- a second forward gear shift stage which is implemented by simultaneously operating the first and third clutches and the first brake;
- a third forward gear shift stage which is implemented by simultaneously operating the first and second clutches and the first brake;
- a fourth forward gear shift stage which is implemented by simultaneously operating the first, second, and third clutches;
- a fifth forward gear shift stage which is implemented by simultaneously operating the first and second clutches and the third brake;
- a sixth forward gear shift stage which is implemented by simultaneously operating the first and second clutches and the second brake;
- a seventh forward gear shift stage which is implemented by simultaneously operating the first clutch and the second and third brakes;
- an eighth forward gear shift stage which is implemented by simultaneously operating the first and third clutches and the second brake;
- a ninth forward gear shift stage which is implemented by simultaneously operating the second and third clutches and the second brake;
- a tenth forward gear shift stage which is implemented by simultaneously operating the third clutch and the first and second brakes;
- an eleventh forward gear shift stage which is implemented by simultaneously operating the second clutch and the first and second brakes; and
- a reverse gear shift stage which is implemented by simultaneously operating the first and third clutches and the third brake.

* * * * *